(12) United States Patent
Whiteman

(10) Patent No.: US 12,405,041 B2
(45) Date of Patent: Sep. 2, 2025

(54) SYSTEMS AND METHODS FOR MANAGING THE HEATING OF THERMAL FLUIDS

(71) Applicant: Deere & Company, Moline, IL (US)

(72) Inventor: Steven R. Whiteman, Dubuque, IA (US)

(73) Assignee: Deere & Company, Moline, IL (US)

( * ) Notice: Subject to any disclaimer, the term of this patent is extended or adjusted under 35 U.S.C. 154(b) by 263 days.

(21) Appl. No.: 18/456,752

(22) Filed: Aug. 28, 2023

(65) Prior Publication Data

US 2025/0075957 A1 Mar. 6, 2025

(51) Int. Cl.
*F25B 49/02* (2006.01)
(52) U.S. Cl.
CPC .................. *F25B 49/022* (2013.01)
(58) Field of Classification Search
CPC .... B60K 25/00; B60K 11/02; B60H 1/00278; B60H 1/00342; B60H 1/00385; B60H 2001/00307; F01P 3/20; F01P 7/162; F01P 11/029; F01P 5/12; F01P 2005/105; F01P 2050/24; F04D 13/024
See application file for complete search history.

(56) References Cited

U.S. PATENT DOCUMENTS

| | | | |
|---|---|---|---|
| 11,739,756 B2 | 8/2023 | Whiteman | |
| 11,958,361 B2* | 4/2024 | Smith | B60K 6/405 |
| 2013/0029193 A1 | 1/2013 | Dyer et al. | |
| 2014/0338376 A1 | 11/2014 | Carpenter et al. | |
| 2018/0229616 A1 | 8/2018 | Rhodes et al. | |
| 2022/0170467 A1 | 6/2022 | Whiteman | |

FOREIGN PATENT DOCUMENTS

| | | |
|---|---|---|
| DE | 102019131731 A1 | 5/2021 |
| DE | 102020206146 A1 | 11/2021 |
| DE | 102020204675 B4 | 3/2022 |
| EP | 4215411 A1 | 7/2023 |

OTHER PUBLICATIONS

Extended European Search Report and Written Opinion issued in European Patent Application No. 24192451.3 dated Feb. 12, 2025, in 05 pages.
Extended European Search Report and Written Opinion issued in European Patent Application No. 24192665.8 dated Feb. 21, 2025, in 11 pages.

\* cited by examiner

*Primary Examiner* — Kun Kai Ma
(74) *Attorney, Agent, or Firm* — Taft Stettinius & Hollister LLP; Stephen F. Rost

(57) ABSTRACT

A system for operating at least a pair of pumps using a driver. The driver can be coupled to a first portion of a first drive shaft that is not positioned in within an interior area of a thermal fluid tank of a first thermal circuit. A magnetic coupling can couple the first portion to a second portion of the first drive shaft that is within the thermal fluid tank. Rotational displacement of the first portion of the first drive shaft can be translated, via the magnetic coupling, to the second portion of the first drive shaft to drive a first fluid pump. The first portion of the first drive shaft can also be coupled to a second drive shaft by a clutch, the second drive shaft being used to operate a second fluid pump that provides a force for circulating a second thermal fluid of a second thermal circuit.

20 Claims, 4 Drawing Sheets

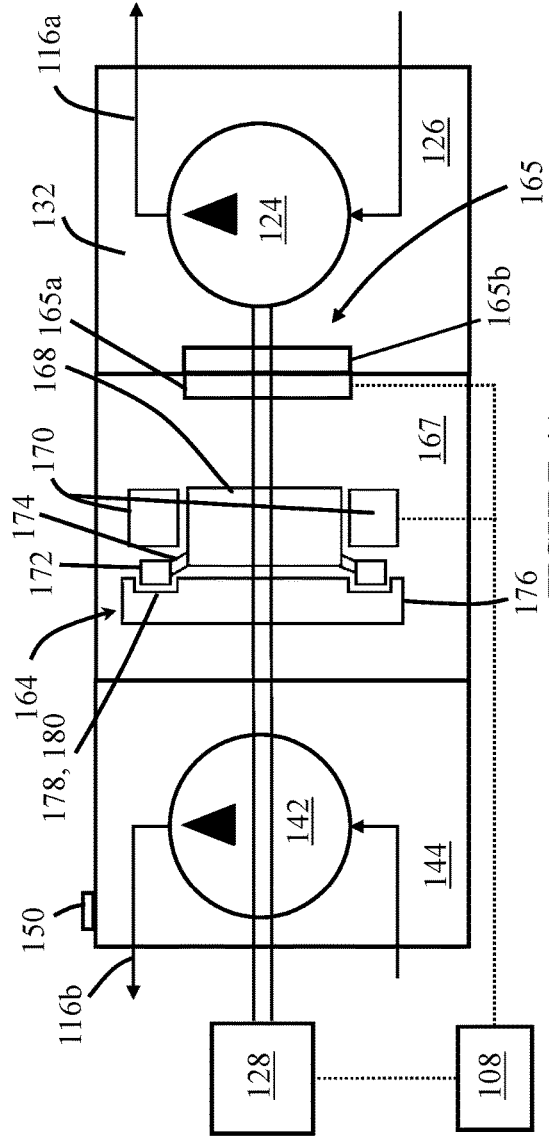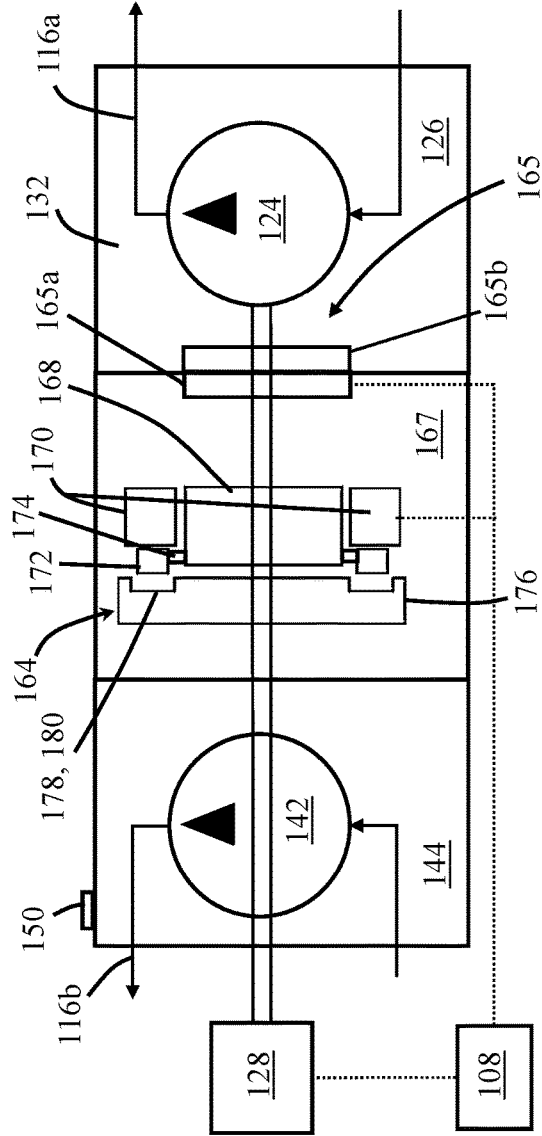
FIGURE 4A
FIGURE 4B

SYSTEMS AND METHODS FOR MANAGING THE HEATING OF THERMAL FLUIDS

FIELD OF THE DISCLOSURE

The present disclosure generally relates to management of thermal fluids used with batteries for electric vehicles, and, more particularly, to systems and methods for managing the warming of a battery thermal fluid and a cab of an associated vehicle.

BACKGROUND

Hybrid electric engines typically operate using a combination of a fuel and electrical energy as sources of power for engine operation. Moreover, hybrid engines can combine features of an internal combustion engine and an electrically powered engine in generating a force, such as a force used with at least propulsion of an associated vehicle. Thus, power for hybrid engines can be generated by combustion of a fuel, including, but not limited to, petroleum and diesel fuel, as well as by use of power stored in one or more batteries, including battery packs.

Whether utilized with hybrid electric engines or electric engines, operation of associated battery systems, and, moreover, the battery(ies) of the battery system, can generate heat. If not controlled, such generated heat can be detrimental to the operation or efficiency of at least the battery. Often, the warming of batteries of electric or hybrid vehicles involves the circulation of an electrically non-conductive dielectric thermal liquid, such as, for example, mineral oil, and which is not air or another gas. However, the viscosity of such dielectric thermal fluids can increase at least at certain lower, or cold temperatures. In such instances, compared to instances at which the dielectric thermal fluid is at elevated temperatures, the relatively high viscous dielectric thermal fluid may not easily flow through the fluid circuit, which can be detrimental to the operation or efficiency of the fluid circuit. Further, instances in which the viscosity of the thermal fluid is relatively high can potentially create issues for the associated components of the fluid circuit, including premature wear of the pump(s) that generate a force to circulate the thermal fluid through the fluid circuit.

Accordingly, thermal management systems for battery systems used with electric engines, including hybrid electric engines, remains an area of interest.

SUMMARY

The present disclosure may comprise one or more of the following features and combinations thereof.

In one embodiment of the present disclosure, a thermal management system is provided that can include a first fluid pump and a second fluid pump, the first fluid pump being positioned for at least partial submersion in a first thermal fluid in a thermal fluid tank, the second fluid pump positioned for at least partial submersion in a second thermal fluid in a first pressurized reservoir of a second thermal circuit. The system can also include a first drive shaft that can be coupled to a driver and the first fluid pump, the first fluid pump being operated by a rotational displacement of the first drive shaft by the driver. The first fluid pump can be configured to provide a first force to circulate the first thermal fluid out through the first fluid circuit. A second portion of the first drive shaft can be positioned in an interior area of the first thermal fluid tank, and a first portion of the first drive shaft can be positioned outside of the thermal fluid tank and not directly physically attached to the second portion of the first drive shaft. The system can also include a second drive shaft that can be coupled to the second fluid pump and coupled to the first portion of the first drive shaft by a clutch. The second fluid pump can be operated by a rotational displacement of the second drive shaft to provide a second force to circulate a second thermal fluid at least through a heat exchanger of a second fluid circuit that can be positioned in the thermal fluid tank. Additionally, the system can include a magnetic coupling having a first portion and a second portion, the first portion of the magnetic coupling that can be attached to the first portion of the first drive shaft and positioned outside of the thermal fluid tank. The second portion of the magnetic coupling can be coupled to the second portion of the first drive shaft and positioned in the interior area of the thermal fluid tank. The magnetic coupling transfer a force between the first and second portions of the magnetic coupling to rotatably displace the second portion of the magnetic coupling, and thereby rotate the second portion of the first drive shaft, with the rotational displacement of the first portion of the magnetic coupling as the first portion of the first drive shaft is rotably displaced by operation of the driver. Additionally, the clutch can be selectively displaceable from an engaged position at which the rotational displacement of the first portion of the first drive shaft is transmitted by the clutch to facilitate the rotational displacement of the second drive shaft, and a disengaged position at which the rotational displacement of the first portion of the first drive shaft is not transmitted by the clutch to facilitate the rotational displacement of the second drive shaft.

In another embodiment, a method is provided for operating a thermal management system. The method can include determining if a temperature is below a predetermined temperature and activating, in response to determining the temperature is below the predetermined temperature, a magnetic clutch to magnetically couple a first portion of the magnetic clutch to a second portion of the magnetic clutch. The first portion of the magnetic clutch can be coupled to a first portion of a first drive shaft that is positioned outside of a thermal fluid tank, and the second portion of the magnetic clutch can be coupled to a second portion of a first drive shaft that is positioned in an interior area of the thermal fluid tank, the second portion of the first drive shaft being coupled to a first fluid pump. A driver can be activated to provide a drive force to rotatably displace the first portion of the first drive shaft, the rotational displacement of the first portion of the first drive shaft being transmitted via the activated magnetic clutch to facilitate rotational displacement of the second portion of first drive shaft. Additionally, an operation of the first fluid pump can be driven by rotational displacement of the second portion of first drive shaft. A clutch that is coupled to the first portion of the first drive shaft and a second drive shaft can be engaged, the clutch being configured to transmit a portion of the drive force to rotatably displaced the second drive shaft. Further, an operation of a second fluid pump of a first pressurized reservoir can be driven by rotational displacement of the second drive shaft. The method can also include circulating, via the operation of the first fluid pump, at least a portion of a first thermal fluid out of the thermal fluid tank and along at least a portion of a first fluid circuit, and drawing, via the operation of the second fluid pump, a second thermal fluid into a heat exchanger in the thermal fluid tank. Additionally, the method can include determining if the temperature has increased to at least satisfy the predetermined temperature, and deactivating, in response to the temperature satisfied the predetermined temperature, the operation of the second fluid pump by disengaging the clutch.

These and other features of the present disclosure will become more apparent from the following description of the illustrative embodiments.

BRIEF DESCRIPTION OF THE DRAWINGS

The disclosure contained herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 4A illustrates an exemplary embodiment of a selectively activated electromagnetic clutch for the thermal management system in an engaged, or closed, condition such that both a first fluid pump and a second fluid pump of the thermal management system are operated by a common driver.

FIG. 4B illustrates the electromagnetic clutch shown in FIG. 4A but in a disengaged, or open, condition such that the first fluid pump, and not the second fluid pump, is operated.

Corresponding reference numerals are used to indicate corresponding parts throughout the several views.

DETAILED DESCRIPTION

Figure 1:
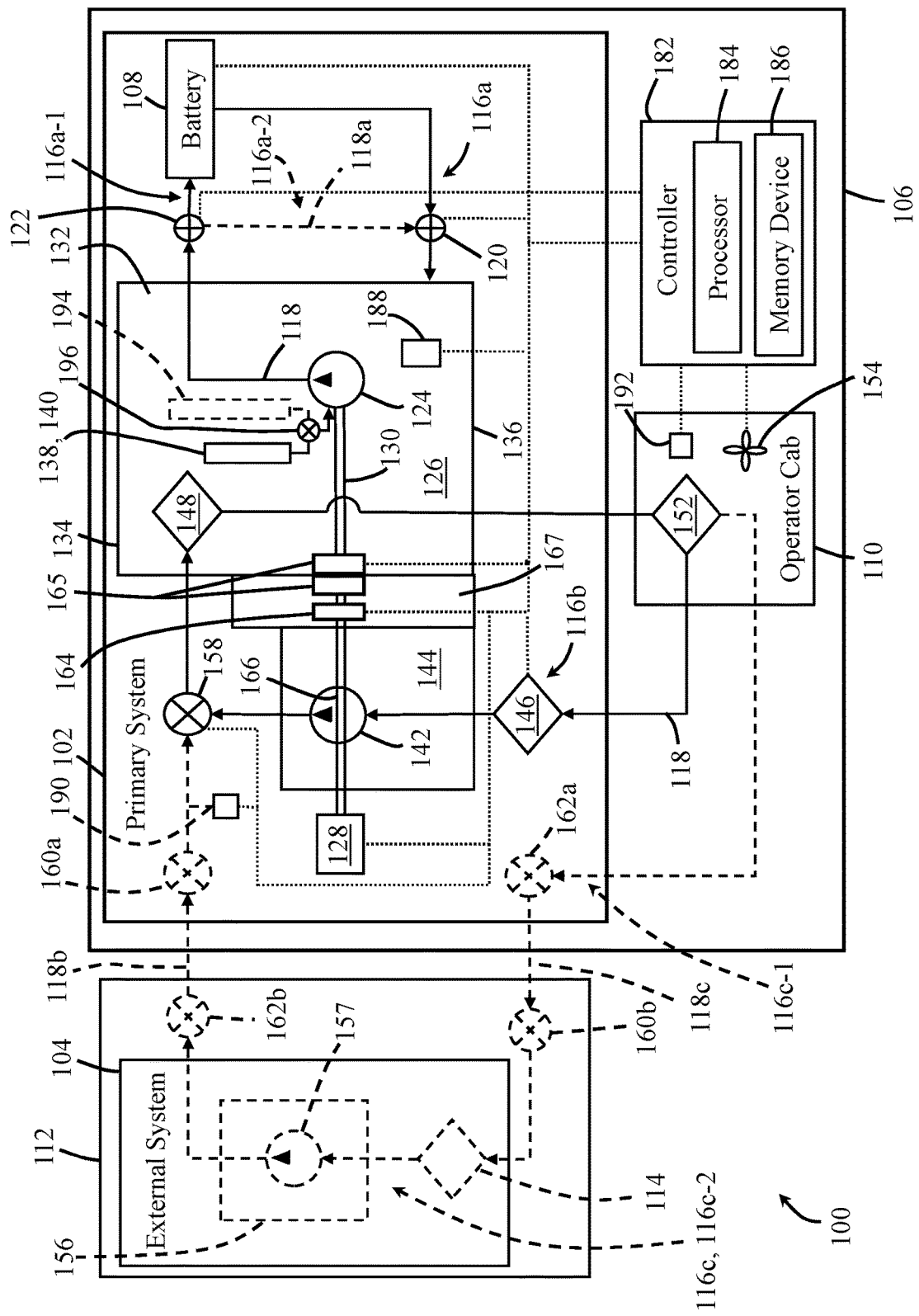
FIG. 1 illustrates an exemplary embodiment of a thermal management system according to an illustrated embodiment of the subject application in which a second thermal fluid is heated via operation of an electric heater, and in which heat is transferred from the heated second thermal fluid to a first, battery thermal fluid.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Embodiments described herein provide systems and methods for an efficient way for warming an operator cab of a vehicle, as well as warming the battery (ies) and associated thermal fluid of an electric vehicle, including, but not limited to, an electric hybrid vehicle.

Compared to heat exchange between thermal fluids, an electric heater can be more effective for heating at least certain types of thermal fluids used in warming circuits, including for example, ethylene glycol and water, as well as combinations thereof, collectively referred to as WEG. Thus, as discussed below, embodiments of the subject disclosure provide a thermal management system having a fluid circuit in a primary system that can heat WEG via use of an electric heater. Such heated WEG can be utilized in connection with heating a thermal fluid that is supplied to one or more batteries, as well as in connection with heating an operator cab of the associated vehicle.

As electric vehicles can be used in a variety of ambient temperature conditions, operation of the electric heater may not always be needed. Thus, to reduce energy consumption, as well as eliminate use of individual drivers for each pump of the thermal management system, embodiments discussed herein can utilize a single driver, double pump arrangement, wherein a common driver is used to provide a force for the operation of a first fluid pump that is used to circulate thermal fluid to the battery, and a second fluid pump used for circulating the WEG. With such an arrangement, a clutch is used to selectively activate, and deactivate, the second fluid pump. Moreover, the clutch can be in a disengaged or open state in warm weather conditions such that the second fluid pump is not operated, which can thereby reduce power usage. Conversely, during colder ambient temperatures when heat may be needed for the thermal fluid circulated to the battery, or for heating the operator cab, the clutch can be in an engaged or closed state such that both the first and second fluid pumps are driven by the common driver.

Additionally, when the onboard battery is unable to provide electrical power for the electric heater, the thermal management system discussed herein includes a provision for heating thermal fluid that is circulated to the battery, and thus warm the battery, using heated WEG from an external system. Such hot WEG from the external system can be provided to a primary system of the thermal management system in a variety of manners, including, for example, via coupling the primary system to an external system via use of external couplings.

When the electric vehicle is expected to sit outside in cold weather without charging, the electric vehicle can also benefit from pumping/purging the thermal fluid from the battery and storing the purged thermal fluid in an insulated thermal fluid tank overnight. This feature can allow for more efficient warming of the thermal fluid overnight, without losing heat in the batteries and plumbing.

FIG. 1 illustrates an exemplary embodiment of a thermal management system 100 according to an illustrated embodiment of the subject application. In the illustrated embodiment, the thermal management system 100 includes a primary system 102 and an external system 104. The primary system 102 can be associated with an electric vehicle 106, including, but not limited to, a hybrid electric vehicle. Thus, the primary system 102 can be part of an electric vehicle 106 having one or more batteries 108 that are utilized to provide electrical power for at least operation of a prime mover, including engine, of the electric vehicle 106. Further, the primary system 102 can be utilized with a variety of different types of electric vehicles, including, but not limited to, agricultural vehicles, such as, but not limited to, harvesters and windrowers, among other agricultural vehicles. According to certain embodiments, the electric vehicle 106 includes an operator cab 110 in which an operator of the electric vehicle 106 can be positioned, including either, or both, seated or stand, while operating the electric vehicle 106.

The external system 104 can be part of another vehicle, equipment, or device (referred to herein collectively as an external device 112), that is not part of the electric vehicle 106 having the primary system 102. Additionally, the external system 104 can be part of, or coupled to, a coolant or heating system of the external device 112 to which the external system 104 belongs. Thus, for example, according to embodiments in which the external device 112 has an engine, among other prime movers, and the external system 104 can be utilized as part of a cooling system for that engine, and well as selectively used as a fluid circuit with the primary system 102 for the below-discussed thermal management system 100. Thus, for example, the external system 104 can include, or be coupled to, a heat exchanger 114, such as a radiator, that is used in connection with cooling a temperature of the engine of the external device 112. In such situations, the external system 104 can contain a thermal fluid that may directly flow to the engine of the external device 112, wherein a temperature of the thermal fluid of the external system 104 is elevated. Alternatively, the external system 104 can be configured for the associated thermal fluid to absorb at least a portion of heat entrained in another thermal fluid, such as, for example, at the heat exchanger 114 of the external system 104.

While the foregoing example discusses heating of the thermal fluid of the external system 104 in connection with an operation of an associated engine, the thermal fluid of the external system 104 can be heated via operation of a variety of other components of the external device 112, including, but not limited to, one or more batteries, inverters, or converters, among other electrical and non-electrical components of the external device 112. Additionally, while the primary system 102 is discussed herein as being utilized with an electrical vehicle, the external device 112 may, or may not, be an electrical vehicle. For example, according to certain embodiments, the external device 112 can be a personal or commercial vehicle that utilizes an internal combustion.

The exemplary thermal management system 100 includes a plurality of fluid circuits 116a-c, with at least one fluid circuit 116c extending between, or be part of, both the primary system 102 and the external system 104. The thermal fluid within each illustrated fluid circuit 116a-c can be transported within the associated fluid circuit 116a-c, as well as between, and, optionally, within, the associated components of the fluid circuit 116a-c, through a variety of types of conduits, tubes, hoses, or pipes, as well as combinations thereof, and the associated fittings, valves, and ports, collectively generally referred to herein as a conduit 118. As discussed below, certain fluid circuits 116a are fluidly isolated from other fluid circuits 116b, 116c so as to at least prevent mixing of the thermal fluids contained therein, while other circuits 116b, 116c can be adapted to accommodate at least potential partial exchange or mixing of similar types of thermal fluids.

The disclosures contained herein discuss the operation of the thermal management system 100 in the context of either or both warming a first thermal fluid for a battery 108, or warming an operator cab 110 of the electric vehicle 106. However, according to certain embodiments, the fluid circuits 116a-c, or thermal fluids contained therein, can also be utilized in connection with other aspects of thermal management of at least the battery 108, associated electric vehicle 106, or another, external device 112. For example, the below disclosure discusses operation of the thermal management system 100 in connection with elevating a temperature of a first thermal fluid that circulates through the battery 108, which can reduce the viscosity of the first thermal fluid. However, at other times, the first thermal fluid circulated through one of the more the below-discussed fluid circuits 116a can also be used for other purposes, including for example, in connection with maintaining temperatures of the battery 108 or an associated engine, prime mover, or electrical components below certain elevated temperatures.

According to the illustrated embodiment, the thermal management system 100 has a first fluid circuit that can selectively accommodate circulation of a first thermal fluid along either a primary flow path 116a-1 or a bypass flow path 116a-2 of the first fluid circuit 116a. As shown in at least FIG. 1, the first fluid circuit 116a can include one or more batteries 108, an inlet control valve 120, and outlet control valve 122, a first fluid pump 124, a thermal fluid tank 126, and a bypass conduit 118a. As seen in at least FIG. 1, in the illustrated exemplary embodiment, the bypass conduit 118a can extend between the inlet and outlet control valves 120, 122.

The primary flow path 116a-1 of the first fluid circuit 116a is configured to deliver the first thermal fluid to at least the battery 108. Conversely, the bypass flow path 116a-2 is configured to bypass the battery 108 such that the first thermal fluid being circulated through the bypass flow path 116a-2 does not circulate through the battery 108. Whether the first thermal fluid flows through the primary flow path 116a-1 or the bypass flow path 116a-2 can be controlled in a variety of manners, including, for example, via the positioning or operation of the inlet and outlet control valves 120, 122. For example, according to certain embodiments, when the inlet and outlet control valves 120, 122 are in a first position, the flow path of the first thermal circuit 116a is open in a manner that allows the first thermal fluid to flow along the primary flow path 116a-1, and thereby to and through the battery 108. Conversely, when the inlet and outlet control valves 120, 122 are at a second position, the flow path of the first thermal circuit 116a is open in a manner that redirects the first thermal fluid to flow through the bypass conduit 118a that is positioned between the inlet and outlet control valves 120, 122, and thereby not be circulated through the battery 108. As discussed below, according to certain embodiments, the bypass flow path 116a-2 can be utilized in at least an attempt to decrease the time before a temperature of the first thermal fluid is elevated to a particular level.

As the first thermal fluid is, via the primary flow path 116a-1 of the first fluid circuit 116a, circulated to at least the battery 108, the first thermal fluid is a dielectric thermal liquid, and is not air or another gas. Moreover, the first thermal fluid is a liquid that can be utilized to remove heat from the battery 108, including, for example, from another thermal fluid within the battery 108, while also being electrically non-conductive. By being electrically non-conductive, the first thermal fluid may not cause electrical short circuiting within the battery 108, or across at least the first fluid circuit 116a or the associated components of the first fluid circuit 116a. Thus, the first thermal fluid may instead generally be an electric insulator. The first thermal fluid can, at least when at elevated temperatures, also have a relatively high thermal conductivity and a relatively low viscosity, which can assist in the first thermal fluid being circulated about the first fluid circuit 116a. However, the first thermal fluid can have a relatively high viscosity when the first thermal fluid is at low or cold temperatures. According to certain embodiments, the first thermal fluid can be mineral oil, as well as various commercially available dielectric thermal fluids, among other dielectric liquids.

As seen in at least FIGS. 1, 4A, and 4B, the first fluid pump 124 is coupled to a driver 128 by a first drive shaft 130. A variety of devices can be utilized for the driver 128, including, for example, an electric motor or actuator. The force generated by the driver 128 can be transmitted to the first fluid pump 124 via at least the first drive shaft 130. Operation of the first fluid pump 124 via at least a portion of the force provided by the driver 128 can provide a force for circulating the first thermal fluid through the first fluid circuit 116a, including the primary flow path 116a-1 and the bypass flow path 116a-2. As seen in FIG. 1, according to certain embodiments, the first fluid pump 124 can be submerged in first thermal fluid within the thermal fluid tank 126.

An interior region 132 of the thermal fluid tank 126 can contain a collection of the first thermal fluid. Further, according to certain embodiments, the thermal fluid tank 126 can be a thermally insulated and vented tank. Additionally, the thermal fluid tank 126 can have an upper portion 134 and a lower portion 136, the upper portion 134 being positioned above, or at a higher vertical position than, the lower portion 136. As heat typically rises, the first thermal fluid at or around the upper portion of the thermal fluid tank 126 can have a temperature that is higher than the temperature of the first thermal fluid that is located at or around the lower portion 136 of the thermal fluid tank 126. Thus, as thermal gradients may develop in the thermal fluid tank 126, a standpipe 138 can be used by, or in connection with, the first fluid pump 124 in at least an attempt to pull the hotter first thermal fluid from the top or upper portion 134 of the thermal fluid tank 126 and into the standpipe 138. Thus, for example, the standpipe 138 can include an inlet 140 that is positioned at or around the upper portion 134 of the thermal fluid tank 126. Moreover, the inlet 140 of the standpipe 138 can be positioned so that the first thermal fluid at or around the inlet 140 is drawn, or flows, into the standpipe 138. Accordingly, to the extent a temperature difference exists between the first thermal fluid in the thermal fluid tank 126, the standpipe 138 can assist with the hotter first thermal fluid located at or around the upper portion 134, rather than the cooler first thermal fluid that may be located around the lower portion 136, of the thermal fluid tank 126 being discharged from the thermal fluid tank 126 and delivered to the battery 108.

The primary system 102 can also include a second fluid circuit 116b that circulates a second thermal fluid that is different than the first thermal fluid. More specifically, compared to the first thermal fluid, the second fluid circuit 116b can circulate an electrically conductive second thermal fluid, including, for example, either, or a mixture of, water or glycol, among other conductive fluids. Additionally, the thermal management system 100 can include a second fluid pump 142 that can provide a force to circulate at least the second thermal fluid through the second fluid circuit 116b. According to certain embodiments, the second fluid pump 142 can be positioned to withdraw a heated second thermal fluid from a pressurized reservoir 144 of the second fluid circuit 116b. As discussed below, the second fluid pump 142 can be selectively operated using the same driver 128 that is used for the operation of the first fluid pump 124, and can be submerged in second thermal fluid within the pressurized reservoir 144.

As seen in at least FIG. 1, the second fluid circuit 116b can include an electric heater 146 that can be selectively powered by electrical power provided by the battery 108. According to certain embodiments, the second thermal fluid can flow, via a force provided by the second fluid pump 142, from the electric heater 146 to a first heat exchanger 148 that can be submerged within first thermal fluid within the thermal fluid tank 126. Alternatively, according to certain embodiments, second thermal fluid that is heated by the electric heater 146 can flow to a pressurized reservoir 144, which can include a pressure relief cap 150 (FIG. 4A), before being circulated to the first heat exchanger 148. The second thermal fluid within the second fluid circuit 116b, including within the pressurized reservoir 144, can be maintained at a variety of pressures, including, but not limited to, pressures between around 10 pounds-per-square inch (PSI) to around 20 PSI, among other pressures or pressure ranges. According to such an embodiment, heated second thermal fluid can be drawn from the pressurized reservoir 144 and into the second fluid pump 142 before being delivered to the first heat exchanger 148. The first heat exchanger 148 within the thermal fluid tank 126 can be utilized to transfer at least a portion of the heat entrained in the second thermal fluid to at least a portion of the first thermal fluid that is in the thermal fluid tank 126. A variety of different types of heat exchangers can be utilized for the first heat exchanger 148, as well as other heat exchangers 114, 152 discussed herein, including, but not limited to, brazed plate heat exchangers, as well as one or more tubes that pass through the interior region 132, among types or configurations of heat exchangers.

According to certain embodiments, the second thermal fluid that is outputted from the thermal fluid tank 126 can be delivered to the operator cab 110 such that heat within the second thermal fluid can be utilized to heat the operator cab 110. Thus, according to certain embodiments, the operator cab 110 can include a second heat exchanger 152 that can be selectively used to transfer heat from the second thermal fluid to air, or other gas, that can be circulated within the operator cab 110. The operator cab 110 can have variety of types of components and devices to control if, and the extent, air heated by the second heat exchanger 152 is released or circulated within the operator cab 110, including, or more convection fans 154, as well as associated vents.

A third fluid circuit 116c can utilize a third thermal fluid that can be the same type of thermal fluid as the second thermal fluid. However, unlike the second fluid circuit 116b in which the primary source for the second thermal fluid can be the associated electric vehicle 106, the primary source of the third thermal fluid used for the third fluid circuit 116c can be the external device 112. Further, as the second and third fluid circuits 116b, 116c can utilized at least some of the same components and conduits 118, at least a portion of the second thermal fluid provided by the electric vehicle 106 can intermix with at least a portion of the third thermal fluid provided by the external device 112, and vice versa. Moreover, according to the illustrated embodiment, a first portion 116c-1 of the third fluid circuit can reside with the external system 104 at the external device 112, and a second portion 116c-2 can reside with the primary system 102, and, moreover, a portion of the second fluid circuit 116b, at the electric vehicle 106. Thus, according to certain embodiments, the second fluid circuit 116b may not be fluidly isolated from the third fluid circuit 116c.

As seen in at least FIG. 1, the second and third fluid circuits 116b, 116c can both utilize the first heat exchanger 148 in the thermal fluid tank 126, and the second heat exchanger 152 for the operator cab 110, as well as the associated conduits 118. Accordingly, similar to the second fluid circuit 116b, the third fluid circuit 116c can pass through the operator cab 110 such that the at least partially heated third thermal fluid flowing through the third fluid circuit 116c can also be utilized to heat the operator cab 110. Thus, according to certain embodiments, the third thermal fluid may not be isolated from the second thermal fluid. However, the second and third fluid circuits 116b, 116c can be fluidity isolated from the first fluid circuits 116a such that the first thermal fluid does not mix with the second and third thermal fluids.

As previously discussed, the external system 104 can include a heat exchanger 114 that can be utilized to heat the third thermal fluid. Additionally, according to certain embodiments, the third fluid circuit 116c can also include a pressurized reservoir 156 that can include a supply of the third thermal fluid. According to such embodiments, the pressurized reservoir 156, which can include a pressure relief cap 150 (FIG. 4A), can be configured to store heated third thermal fluid. Moreover, the reservoir 156 can be can be configured to store the third thermal fluid at elevated pressures such that the reservoir 156 is a pressurized reservoir 156 that maintains the heated third thermal fluid at an elevated pressure, including, for example, at pressures in the range of around 10 PSI to around 20 PSI, among other pressure levels or ranges.

As the third thermal fluid can be heated by the external device 112, the third fluid circuit may bypass, or otherwise not include, the electric heater 146. Thus, the second and third fluid circuits 116b, 116c can include a circuit control valve 158 that controls whether the second thermal fluid of the second fluid circuit 116b that has been heated by the electric heater 146, or the third thermal fluid of the third fluid circuit 116c that has been heated by the heat exchanger 114 of the external device 112, is to be delivered to the first heat exchanger 148 within the thermal fluid tank 126.

Additionally, the third fluid circuit 116c can include one or more inlet ports 160a, 160b and outlet ports 162a, 162b that can each be selectively coupled to a conduit 118b, 118c, such as, for example, a hose, tube, or pipe, such the portion of the third fluid circuit 116c residing with the external system 104 can be selectively connected, and disconnected, from the portion of the third fluid circuit residing with the primary system 102. For example, according to certain embodiments, the inlet and outlet ports 160a-b, 162a-b can each comprise a quick connect hose connector or fitting, among other fittings and connectors.

Referencing FIGS. 4A and 4B, the first and second fluid pumps 124, 142 can be in a double pump drive arrangement. Moreover, a single driver 128 can be utilized to drive both the first and second fluid pumps 124, 142. For example, as shown in FIGS. 4A and 4B, the driver 128 can be coupled to the first fluid pump 124 such that operation of the driver 128 results in associated operation of the first fluid pump 124. Moreover, the first fluid pump 124 can be coupled to the driver 128 in a manner in which the first fluid pump 124 is operated each time that the driver 128 is operated. Thus, when the driver 128 is operated, the driver 128 facilitates rotational displacement of a first drive shaft 130, and thus associated operation of the first fluid pump 124.

Unlike the operation of the first fluid pump 124, the second fluid pump 142 can be coupled to the driver 128 in a manner that accommodates selective operation of the second fluid pump 142 while the driver 128 and first fluid pump 124 are operated. For example, according to certain embodiments, a clutch 164, including, for example, an electromagnetic clutch, can be utilized to selectively accommodate rotational displacement of a second drive shaft 166 that is coupled to, and used to operate, the second fluid pump. According to the example embodiment shown in FIGS. 4A and 4B, the clutch 164 can include a rotor 168 that is coupled to the first drive shaft 130 so that the rotor 168 rotates with the rotation of the first drive shaft 130. The clutch 164 can also include one or more coils 170 that are positioned about, or around, the rotor 168, and which are electrically coupled to at least one battery 108, among other sources of electrical power. A supply of electrical power to the coil 170 can result in the generation of a magnetic field at or around the coil 170.

The clutch 164 can further include one or more clutch bodies 172 that are constructed of a material that can either, or both, be attracted or repelled by the magnetic field(s) generated via the supply of electrical power to the coil 170. According to certain embodiments, the clutch body 172, which can be one or more magnets, can be attached to a biasing element 174 that can bias the clutch body 172 to one of a first position (FIG. 4A) and a second position (FIG. 4B). Additionally, or alternatively, the clutch 164 can be configured to accommodate at least displacement of the clutch body 172 in response to a magnetic field provided by, or removed, via the operation coil(s) 170. Thus, for example, according to certain embodiments, the magnetic field generated by use of the coil 170 can have a strength to attract or repel the clutch body 172 with a force sufficient to overcome the biasing force of the biasing element 174, thereby displacing the clutch body 172. Further, the clutch body 172 can be coupled to, or part of, the rotor 168 such that the clutch body 172 is rotatably displaced with the rotor 168 as the driver 128 provides a force that rotates the first drive shaft 130.

The clutch 164 can also include an armature 176 that is coupled to the second drive shaft 166 such that rotation of the armature 176 can facilitate rotation of the second drive shaft 166. According to the illustrated embodiment, the armature 176 can include one or more armature bodies 178 that are each configured to be selectively engaged and disengaged with the clutch body 172. For at least purposes of illustration, the armature bodies 178 comprise one or more recesses 180, each recess 180 being sized to receive placement of a clutch body 172 when the clutch body 172 is at a first position (FIG. 4A). According to the illustrated embodiment, the clutch body 172 can be at the first position via a force provided by the biasing element 174. By being within a recess of the armature 176, the clutch body 172 can engage, or abut against, a surface or wall of the armature 176. Using such engagement between clutch body 172 and armature 176, as the clutch body 172 and rotor 168 rotate with the rotation of the first drive shaft 130, the clutch body 172 can transmit a force to the armature 176 that facilitates rotational displacement of the armature 176 and thus the second drive shaft 166. Such rotational displacement of the second drive shaft 166 can thus provide a force utilized to activate, and operate, the second fluid pump 142.

Further, according to the illustrated example, the clutch body 172 can be displaced from the first, engaged or closed position (FIG. 4A) to the second, disengaged or open position (FIG. 4B). Moreover, in this example, the magnetic field generated by a supply of electrical power to the coil 170 can generate a magnetic force that overcomes the biasing force of the biasing element 174, and pulls or displaces the clutch body 172 away from the armature 176. In such a situation, the clutch body 172 can be moved to a location at which the clutch body 172 does not, or cannot, engage an armature body 178. With the clutch body 172 disengaged from a corresponding armature body 178, rotational displacement of the clutch body and rotor 168 is not transferred to the armature 176. Thus, with the clutch body 172 disengaged from the armature 176, force provided by driver 128 that rotates the first drive shaft 130 such that the first fluid pump 124 is operated, but does not rotate the second drive shaft 166, thereby causing the second fluid pump 142 to be deactivated, or otherwise not operate.

The above discussed configuration accommodates selective operation of the second fluid pump 142 while the first fluid pump 124 can generally be continuously operated via operation of the driver 128. Such selective operation of the second fluid pump 142 can, according to certain embodiments, be generally limited to during specific low temperature ambient conditions. More specifically, the second fluid pump 142 can be disengaged, via operation of the clutch 164, when heating of the first thermal fluid by the second thermal fluid is not needed. Such a one motor, dual pump configuration can provide benefits with respect to at least space savings in terms of the footprint of the motor/pump system, as well as provide savings associated with component costs, installation, and maintenance. Additionally, utilizing a single driver 128 can potentially improve the reliability of the system.

The first and second fluid pumps 124, 142 can also be utilized to maintain the associated first and second thermal fluids within certain predetermined pressure limits. According to certain embodiments, the magnetic coupling provided by the clutch 164 can be adapted to control, or limit, the torque exerted by the clutch 164 onto the armature 176, and thus control the torque exerted by the second drive shaft 166 in operating the second fluid pump 142. By limiting the torque, the operation of the second fluid pump 142 can be controlled in a manner in which the operation of the second fluid pump 142 does not exceed a pump pressure limit, including a pressure limit for the second thermal fluid and the third thermal fluid in the second and third fluid circuits 116b, 116c, respectively. Such limiting of the torque outputted by the clutch 164 can be achieved in a variety of manners, including, for example, via the number and spacing of clutch bodies 172, and more specifically magnets. Further, configuring the torque transmitted by the clutch 164, and thus used in the operation of the second fluid pump 142 so as to generally match a pump or thermal fluid pressure limit can allow for an elimination of a pressure relief valve for the second fluid circuit 116b.

While the foregoing discusses an exemplary clutch 164, the clutch 164 described herein can include a variety of other components, including bearings, drive hubs, and flanges, among other components. Additionally, a range of other clutch configurations, including different electromagnetic clutch configurations, can also be utilized for the clutch 164 of the thermal management system 100 discussed and described herein.

Additionally, according to other embodiments, rather than utilizing a common driver 128, each of the first and second fluid pumps 124, 142 can be operated using a different, or separate driver 128. According to such an embodiment, a first driver can be utilized to operate the first fluid pump 124, and a second driver can be utilized to operate the second fluid pump 142. Thus, with such embodiments, whether, or when, thermal fluid is to flow through the associated fluid circuit 116a-c can be controlled by separate, or individual, activation and deactivation of the associated first and second drivers.

As previously discussed, the first and second fluid pumps 124, 142, and at least portions, if not all, of the first and second drive shafts 130, 166, can be submerged in thermal fluid within the thermal fluid tank 126 and pressurized reservoir 144, respectively. For example, as seen in at least FIGS. 4A and 4B, according to certain embodiments, a first portion 165a of a magnetic coupling 165 can be coupled to a portion of the first drive shaft 130 that is outside of the interior region 132 of the thermal fluid tank 126. Further, a second portion 165b of the magnetic coupling 165 can be coupled to a portion of the first drive shaft 130 that is inside of the interior region 132 of the thermal fluid tank 126. According to such an embodiment, the rotational force being used to rotate the portion of the first drive shaft 130 that is outside of the interior region 132 of the thermal fluid tank 126 can be transmitted to rotate the portion of the first drive shaft 130 that is inside of the interior region 132 via the magnetic coupling 165. Thus, such an embodiment can accommodate rotation of the first drive shaft 130 within the interior region 132 so as to provide a force for operation of the first fluid pump 124 without the first drive shaft 130 passing through, or otherwise breaching, a sidewall of the thermal fluid tank 126. Such a configuration can thereby eliminate the use of pump shaft seals. As pump shaft seals traditionally can be a potential area of weakness in the durability of pumps, eliminating pump shaft seals can improve the durability of either or both the first and second fluid pumps 124, 142.

While the foregoing example is discussed and illustrated with respect to use of a magnetic coupling 165 with the first drive shaft 130 and the thermal fluid tank 126, additionally, or alternatively, a similar magnetic coupling 165 can be utilized with the second drive shaft 166 and the pressurized reservoir 144 in connection with operation of the second fluid pump 142. Additionally, as shown in FIGS. 1-4B, according to certain embodiments, the clutch 164 and first portion 165a of the magnetic coupling 165 can be housed in a drive housing 167 that is separate, and may be fluidly isolated, from the thermal fluid tank 126 and the pressurized reservoir 144.

The thermal management system 100 can also include a controller 182 having one or more processors 184 that can follow instructions, including control instructions, contained within, or are part of, one or more memory devices 186, including, for example, a non-transitory machine readable medium. The exemplary embodiment shown in at least FIG. 1 illustrates the controller 182 as being separate from the primary system 102, and instead being part of another portion of the electric vehicle 106. However, according to other embodiments the primary system 102, or other system of the electric vehicle 106, can have a controller 182 that is dedicated to the operation of the primary system 102 alone or in conjunction with the external system 104. As also shown in at least FIG. 1, the controller 182 can be electrically coupled to the battery 108, and moreover may be powered by operation of the battery 108.

The thermal management system 100 can also include one or more temperature sensors 188 that can be communicatively coupled to the controller 182. According to the illustrated embodiment, at least one temperature sensor 188 is positioned within the thermal fluid tank 126, and can provide information indicating, or used to determine, a temperature of the first thermal fluid contained within the thermal fluid tank 126. Information provided to the controller 182 by the temperature sensor 188 can provide an indication to the controller 182, including, for example, the processor 184, of whether the second thermal fluid is to be circulated at least through the thermal fluid tank 126 to heat the first thermal fluid. Thus, using such information, the controller 182 can provide instructions that can result in the battery 108 providing electrical power to the coil(s) 170 of the clutch 164 in a manner that can engage the clutch body(ies) 172 to engage the armature 176 so as to facilitate rotational displacement of the second drive shaft 166 and associated operation of the second fluid pump 142. Further, to the extent the driver 128 does not continuously operate, the controller 182, including, for example, the processor 184, can generate instructions that can activate, as well as deactivate, operation of the driver 128.

The controller 182, including, for example, the processor 184, can operate a plurality of control valves 120, 122, 158, 196 of the primary system 102. For example, the controller 182 can be utilized to operate the inlet and outlet control valves 120, 122 so as to control whether first thermal fluid flows along the primary flow path 116a-1 or bypass flow path 116a-2 of the primary fluid circuit 116. Additionally, the controller 182, including, for example, the processor 184, can control the operation of the circuit control valve 158 so as to control whether second thermal fluid of the second fluid circuit 116b or the third thermal fluid of the third fluid circuit 116c flows to the thermal fluid tank 126. As discussed below, such determination by the controller 182 can be based on a variety of factors including, for example, whether the external system 104 is fluidly coupled to the primary system 102, and whether the controller 182 identifies the battery 108 as having sufficient electrical power available for operating the electric heater 146.

With respect to the third fluid circuit 116c, the controller 182 can also determine whether the external system 104 is fluidly coupled to the primary system 102 in a variety of manners, including, for example, via use of a sensor 190. For example, according to certain embodiments, the primary system 102 can include a pressure, flow or temperature sensor 188, as well as a combination thereof, among other sensors. Although the sensor 190 shown in at least FIG. 1 is positioned between the inlet port 160a of the primary system 102 and the circuit control valve 158, the sensor 190 can be positioned along a variety of other locations about the third fluid circuit 116c. Additionally, according to certain embodiments, the sensor 190 can detect either or both an inlet conduit 118b or an outlet conduit 118c being coupled to the associated inlet or outlet port 160a, 162a of the primary system 102 in a manner that can indicate that external system 104 is fluidly coupled to the primary system 102.

Referring again to FIG. 1, FIG. 1 illustrates a scenario in which the primary flow path 116a-1 of the first fluid circuit 116a is open, as indicated by solid line format for the associated conduits 118 and associated components. In this scenario, the bypass flow path 116a-2 of the first fluid circuit 116a is closed, as indicated by the broken line format for the associated conduits 118 and components. Additionally, in the scenario illustrated in FIG. 1, the second fluid circuit 116b is open, while the third fluid circuit 116c is closed, as also indicated by the solid and broken line formats, respectively, of the illustrated conduits 118 and associated components. Such a scenario can arise, for example, in situations in which the temperature of the first thermal fluid is to be elevated, and the battery 108 has sufficient power to operate the electric heater 146. Additionally, such a scenario can arise when the external system 104 is not fluidly coupled to the primary system 102, including, for example, when the inlet and outlet conduits 118b, 118c are not coupled to the associated inlet and outlet ports 160a-b, 162a-b.

According to the scenario illustrated in FIG. 1, the controller 182 can receive a signal from the temperature sensor 188 in the thermal fluid tank 126 indicating the temperature of the first thermal fluid is to be increased. In such a situation, to the extent not already at the first position, controller 182 can generate a signal to place the inlet and outlet control valves 120, 122 both at the first position such that first thermal fluid flows through the battery 108, and not through the bypass conduit 118a. Further, to the extent necessary, the controller 182 can also generate a signal to facilitate the circuit control valve 158 being operated to place the circuit control valve 158 at a first position such that the second thermal fluid of the second fluid circuit 116b can be circulate through the electric heater 146, and the first heat exchanger 148 in the thermal fluid tank 126. Further, the controller 182 can generate a signal to facilitate the clutch 164 being at the first, engaged position such that the rotational force provided by the driver 128 is used to rotate both the first and second drive shafts 130, 166, and thereby result in operation of the associated first and second fluid pumps 124, 142. For example, according to the exemplary illustrated embodiment, the controller 182 can generate a signal that accommodates the biasing force of the biasing element displacing the clutch body 172 into engagement with the armature 176. The controller 182 can also generate a signal to facilitate the battery 108 providing power to operate the electric heater 146, and, moreover, for the electric heater 146 to be operated in a manner that heats the second thermal fluid.

Accordingly, with the scenario shown by FIG. 1, with the second fluid pump being operated, second thermal fluid that has been heated by the electric heater 146 can be circulated to the first heat exchanger 148 in the thermal fluid tank 126. Optionally, according to certain embodiments, after being heated, and before being circulated by the second fluid pump 142 to the first heat exchanger 148, the heated second thermal fluid can be delivered to the pressurized reservoir 144. Thus, according to such an embodiment, the heated second thermal fluid may be drawn from the pressurized reservoir 144 of the second fluid circuit 116 before being circulated to the first heat exchanger 148.

By passing through the first heat exchanger 148, heat entrained in the second thermal fluid can be transferred to at least a portion of the first thermal fluid that is contained in the thermal fluid tank 126. Upon exiting the thermal fluid tank 126, the second thermal fluid, which is not intermixed with the first thermal fluid in the thermal fluid tank 126, can still remain partially heated, or otherwise be at an elevated temperature. Thus, the second thermal fluid can be circulated from the thermal fluid tank 126 and be delivered to the second heat exchanger 152 in, or around, the operator cab 110. At least a portion of the heat remaining within the second thermal fluid can then be transferred to at least a portion of an air or gas that is to be circulated in, and used to heat, the operator cab 110. For example, as shown at least FIG. 1, the controller 182 can be used to operate a fan 154 that can circulate air through or around the second heat exchanger 152 so as to heat the air that is to be circulated in the operator cab 110. The at least partially cooled second thermal fluid can then flow from the second heat exchanger 152 and to the electric heater 146, wherein the electric heater 146 can again reheat the second thermal fluid.

The process of circulating the second thermal fluid through the second fluid circuit 116b can continue until the temperature sensor 188 provides a signal to the controller 182 indicating that the first thermal fluid within the thermal fluid tank 126 has attained a first predetermined temperature or temperature range. Upon the first thermal fluid being heated to the first predetermined temperature, the controller 182 can generate a signal used to operate the clutch 164 in a disengaged state such that the force generated by the driver 128 is no longer transmitted to the second drive shaft 166. For example, as discussed above, according to the exemplary embodiment, the controller 182 can generate a signal for electrical power be delivered to the coil 170 so as to generate a magnetic force that can overcome the biasing force of the biasing element 174, thereby facilitating the clutch body 172 being displaced to the second, disengaged position. With the clutch body 172 at the second, disengaged position, rotation of the second drive shaft 166 can cease, thereby deactivating operation of the second fluid pump 142.

With respect to the first thermal fluid, the standpipe 138 can be used to draw first thermal fluid from an upper region of the thermal fluid tank 126 into the first fluid pump 124. As previously discussed, the inlet 140 of the standpipe 138 can be positioned at a vertically elevated position within the thermal fluid tank 126 so that first thermal fluid at or around the upper portion 134 of the thermal fluid tank 126 that has a higher or elevated temperature relative to first thermal fluid located at the lower portion of the thermal fluid tank 126 can be both drawn into the standpipe 138, and be outputted from the thermal fluid tank 126 via operation of the first fluid pump 124. The first fluid pump 124 can pump the first thermal fluid out of the thermal fluid tank 126 and through the inlet control valve 120 before the first fluid pump 124 is circulated through the battery 108. To the extent the first thermal fluid has been heated or warmed, at this stage of the operation heat within the first thermal fluid can be used to warm the battery, including thermal fluid contained within the battery 108. However, as previously discussed, while the foregoing is discussed in terms of heating the first thermal fluid and, to the extent necessary, the thermal fluid within the battery, according to certain embodiments, once either or both the first thermal fluid and thermal fluid within the battery reach elevated temperatures, the first thermal fluid can subsequently be involved with the removal of heat from the battery 108, including removing heat from thermal fluid within the battery 108.

After being circulated through the battery 108, the first thermal fluid can flow through the outlet control valve 122 and back into the thermal fluid tank 126. According to certain embodiments, the first thermal fluid can be returned to the lower portion 136 of the thermal fluid tank 126 such that the returned first thermal fluid has an opportunity to be heated via heat provided by the second thermal fluid passing through the first heat exchanger 148 before being subsequently drawn into the standpipe 138.

Figure 2:
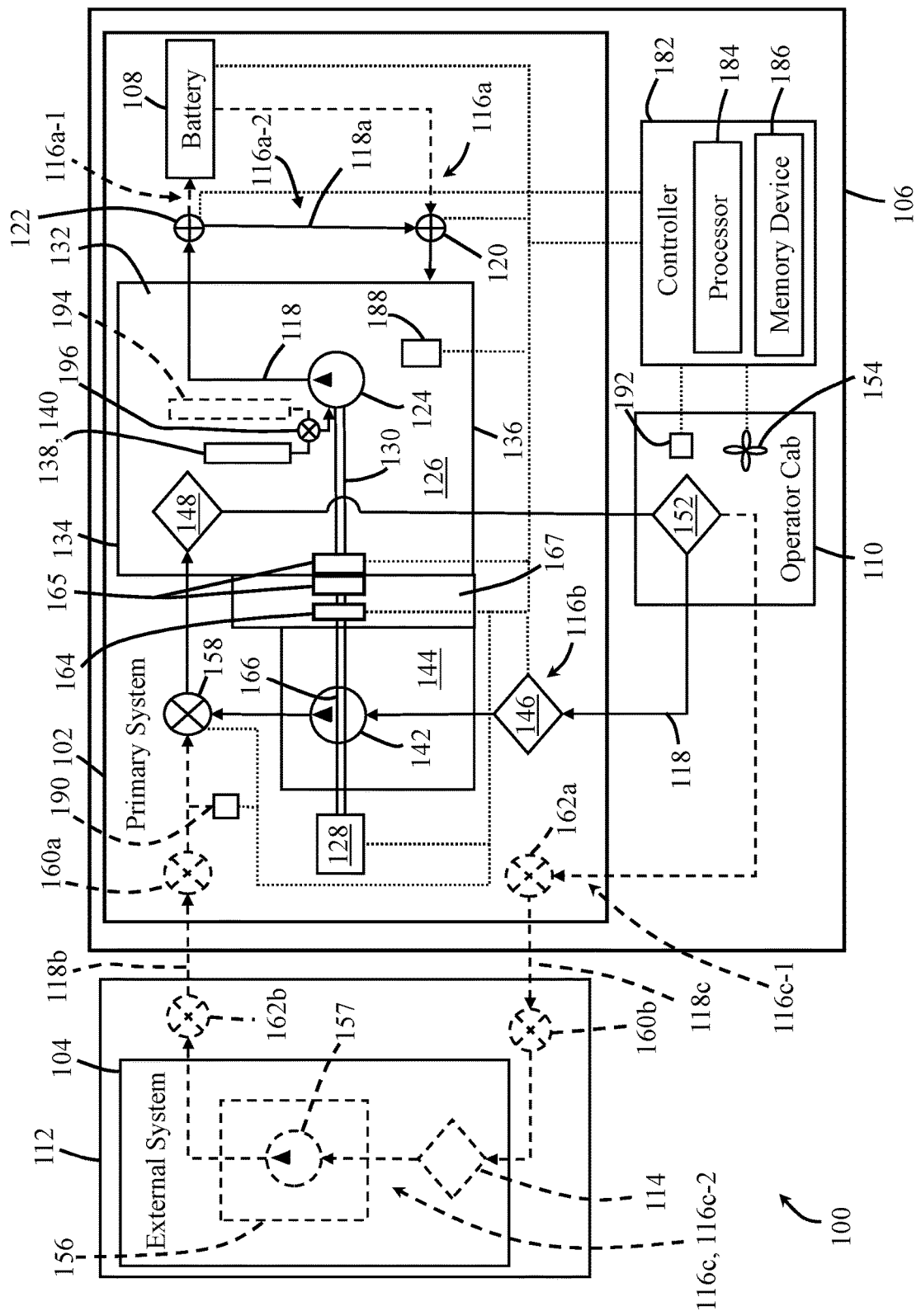
FIG. 2 illustrates the exemplary embodiment shown in FIG. 1, but in which the first, battery thermal fluid bypasses the battery and instead flows along a bypass flow path.

FIG. 2 illustrates a scenario similar to that shown in FIG. 1, but in which the first thermal fluid is circulated about the bypass flow path 116a-2 of the first fluid circuit 116a. Thus, in the scenario shown in FIG. 2, the second fluid pump is again being operated such that the second thermal fluid flows through the second fluid circuit 116b in a manner similar to that discussed above with respect to FIG. 1. Further, the first fluid pump 124 is also operated such that first thermal fluid is drawn into the standpipe 138 and is outputted from the thermal fluid tank 126. However, unlike the scenario shown in FIG. 1, in FIG. 2 the inlet and outlet control valves 120, 122 have, in response to a signal provided by the controller 182, been placed at the second position at which the bypass flow path 116a-2 is open, and the primary flow path 116a-1 is closed. As previously discussed, with the bypass flow path 116a-2 open, rather than first thermal fluid flowing through the battery 108 as the first thermal fluid is circulated through the first fluid circuit 116a, the first thermal fluid instead flows through the bypass conduit 118, thereby bypassing the battery 108.

The bypass flow path 116a-2 can be used in an attempt to quicken the time to heat the first thermal fluid. For example, as the first thermal fluid does not flow through the battery 108, to the extent the first thermal fluid has been warmed or otherwise contains heat, while the bypass flow path 116a-2 is open, the heat in the first thermal fluid is not transferred to thermal fluid within the battery 108. Instead, the first thermal fluid outputted from the thermal fluid tank 126 is returned to the thermal fluid tank 126. Heat within the first thermal fluid can then be used to at least assist in heating the first thermal fluid within the thermal fluid tank 126. Accordingly, to the extent there is heat within the first thermal fluid, by using the bypass flow path 116a-2, the heat can generally be retained within the first thermal fluid, which can assist in decreasing the time before the first thermal fluid reaches an elevated temperature.

Whether the bypass flow path 116a-2 is, or is not, to be opened, can be based on a variety of criteria. For example, according to certain embodiments, the temperature sensor 188 within the thermal fluid tank 126 can provide information to the controller 182 indicating the first thermal fluid is at, or below, a second predetermined temperature such that the extent the temperature of the first thermal fluid is to be raised warrants at least temporary use of the bypass flow path 116a-2. According to such an embodiment, upon the temperature of the first thermal fluid satisfying, or exceeding, the second predetermined temperature, the controller 182 can issue a signal to adjust the inlet and outlet control valves 120, 122 from being at the second position to the first position so as to close the bypass flow path 116a-2 and open the primary flow path 116a-1.

Additionally, or alternatively, according to certain embodiments, the bypass flow path 116a-2 can be open when the controller 182 receives information indicating the second or third thermal fluids are at, or below, a third predetermined temperature that may indicate the second or third thermal fluids currently lack sufficient heat for heating the first thermal fluid. The third predetermined temperature may be the same as, or different than, the second predetermined temperature utilized in evaluating the temperature of the first thermal fluid. According to such an embodiment, upon the temperature of the second or third thermal fluid satisfying, or exceeding, the third predetermined temperature, such as reaching a temperature that can relatively quickly heat the first thermal fluid, the controller 182 may issue a signal to the inlet and outlet control valves 120, 122 that closes the bypass flow path 116a-2 and opens the primary flow path 116a-1.

Regardless of whether the first thermal fluid is being circulated through the bypass flow path 116a-2 or the primary flow path 116a-1, while the first thermal fluid is being heated or warmed, the clutch 164 can remain engaged such that the force provided by the driver 128 is operating both the first fluid pump 124 and the second fluid pump 142. Moreover, as discussed above, the second fluid pump 142 can continue to be operated at least until the first thermal fluid reaches a temperature that satisfies or exceeds the first predetermined temperature. As previously discussed, upon the controller 182 determining the first thermal fluid satisfies or exceeds the first predetermined temperature, the controller 182 can issue a signal for the disengagement of the clutch 164 such that the second drive shaft 166 is not rotated using power from the driver 128, and thereby deactivates the second fluid pump 142.

Figure 3:
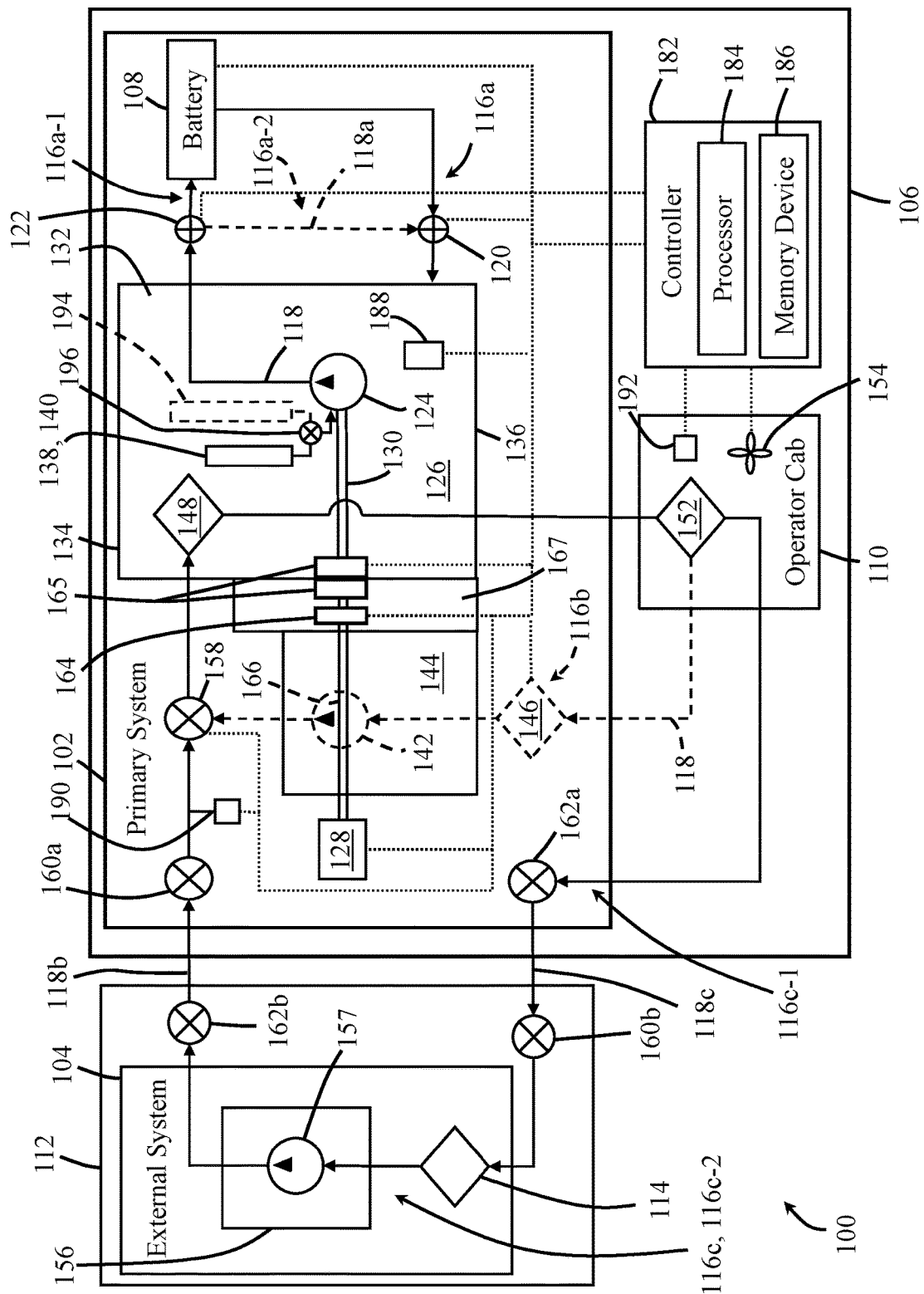
FIG. 3 illustrates the exemplary embodiment shown in FIG. 1, but in which a third thermal fluid of an external system is utilized to provide heat for at least the first, battery thermal fluid.

While FIGS. 1 and 2 are discussed above with respect to using the second thermal fluid of the second fluid circuit 116b to heat the first thermal fluid, the third thermal fluid of the third fluid circuit 116c can be used in a similar matter for heating the first thermal fluid. For example, FIG. 3 illustrates a scenario in which the circuit control valve 158 has been, via a signal provided by the controller 182, placed at a second position. With the circuit control valve 158 at the second position, a third fluid pump 157 of the external device 112 or external system 104, including, for example, a water pump, can be utilized to circulate third thermal fluid from the pressurized reservoir 156 and through the third fluid circuit 116c. Such a scenario can arise for a variety of reasons. For example, such a scenario can arise in response to the controller 182 determining the battery 108 lacks sufficient available electrical power to supply electrical power for the operation of the electric heater 146, or lacks sufficient electrical power to accommodate operation of the electric heater 146 while also providing electrical power for other operations of the thermal management system 100 or associated electric vehicle 106. According to certain embodiments, in such a situation, the controller 182, including the processor 184, can output a signal to inform an operator of electric vehicle 106 that the battery 108 will not, or cannot, supply electrical power to the battery 108. Such a signal for communicating to the operator the status of the battery 108 can be provided to an information device or input/output device 192, such as, for example, a monitor, display, touch screen, speaker, or light that may be positioned in the operator cab 110 or on a mobile device, smartphone, or tablet of the operator. Moreover, such a signal can inform the operator to connect the inlet and outlet conduits 118b, 118c to the associated inlet and outlet port 160a-b. 162a-b so as to fluidly couple the primary and external systems 102, 104, and, moreover, to complete the third fluid circuit 116c. According to certain embodiments, the controller 182 can await a signal from the sensor 190 indicating the portion 116c-2 of the third thermal fluid circuit 116c residing with the external device 112 is fluidly coupled to the portion 116c-1 of the third thermal fluid circuit 116c residing with the primary system 102 before operating the circuit control valve 158 and attempting to draw third thermal fluid from the pressurized reservoir 156 into the primary system 102, and, moreover, into the second portion 116c-2 of the third fluid circuit 116. Alternatively, the controller 182 can await receipt of a signal inputted by the operator prior to adjusting the circuit control valve 158 and attempting to draw third thermal fluid from the pressurized reservoir 156 of the third fluid circuit 116c into the primary system 102.

With the external device 112 fluidly coupled to the primary system 102, the circuit control valve 158 the driver 128 can provide a force that operates the first fluid pump 124 while the third fluid pump 157 is used to circulate the third thermal fluid. As previously mentioned, in such a situation, the first thermal fluid can be circulated in a manner similar to that discussed above with respect to either FIG. 1 or 2. Further, as previously discussed, in such scenarios, the operation of the third fluid pump 157 can draw heated third thermal fluid from the pressurized reservoir 156 and into the first heat exchanger 148 in the thermal fluid tank 126. At the first heat exchanger 148, heat entrained in the third thermal fluid can be transferred to at least a portion of the first thermal fluid without the third thermal fluid being mixed with the first thermal fluid. The at least partially cooled third thermal fluid can be circulated from the first heat exchanger 148, out of the thermal fluid tank 126, and into the second heat exchanger 152. At least a portion of the heat remaining within the third thermal fluid can be transferred to air that is to be circulated in the operator cab 110, thereby at least assisting in heating the operator cab 110. As previously discussed, such a heat exchange at the second heat exchanger 152, and heating of the operator cab 110, can be assisted by the operation of the fan 154, the cooled third thermal fluid can then be circulated to the heat exchanger 114 of the external device 112 before being returned to the pressurized reservoir 156. Such a process can continue until the controller 182 determines the first thermal fluid satisfies or exceeds the first predetermined temperature. Following a determination that the first thermal fluid satisfies or exceeds the first predetermined temperature, the controller 182 can issue a signal for the detachment of the inlet and outlet conduits 118b, 118c from the inlet and outlet ports 160a-b, 162a-b, respectively. Additionally, or optionally, the circuit control valve 158 can be operated to return to the first position.

Referring to FIGS. 1-3, as previously, mentioned, when the electric vehicle 106 is expected to sit outside in cold weather without charging of the battery 108, the electric vehicle 106 can also benefit from pumping or purging the first thermal fluid from the battery 108 and storing the first thermal fluid in the insulated thermal fluid tank 126 overnight. Such a condition can allow for more efficient warming of the first thermal fluid overnight, while minimizing the loss of heat in the battery 108 and associated conduits 118 of the first fluid circuit 116a. Thus, according to certain embodiments, the primary fluid circuit 116 can include an air tube 194 that can provide a supply of air that is to be circulated through at least the battery 108 and associated conduits 118 of the primary fluid circuit 116a in connection with the purging of the first thermal fluid to the thermal fluid tank 126. According to certain embodiments, the inlet of the air tube 194 can be positioned within the thermal fluid tank 126 at a location above an anticipated vertical height of the first thermal fluid within the tank 126. The inlet of the air tube 194 can, however, be positioned at a variety of other locations, including outside of the thermal fluid tank 126. A purge control valve 196 can be operably positioned to control whether first thermal fluid is to be drawn through the standpipe 138 and into the first fluid pump 124, or if the first fluid pump 124 is instead to receive air that flows into the air tube 194. According to the illustrated embodiment, operation of the purge control valve 196 can be controlled by a signal received from the controller 182.

Whether the purge control valve 196 is to be changed from being at a first position in which first thermal fluid is supplied to the first fluid pump 124, or at a second position at which air is supplied to the first thermal pump can be based on a variety of factors. For example, the controller 182 can be configured to determine if the electric vehicle 106 has not been operated for a predetermined time period, and that the battery 108 has not been charged during that time period. If the controller 182 can also be configured to determine whether ambient temperatures in the environment are at, or below, a predetermined temperature. The controller 182 determines one or more, if not all, of such conditions exist, among other conditions, the controller 182 can be configured to automatically generate a signal to place the purge control valve 196 at the second position, and to activate the driver 128 such that the first fluid pump 124 circulates air into the first fluid circuit 116a so as to displace at least a portion, if not all, of the first thermal fluid in the battery 108 and associated conduits 118 of the first fluid circuit 116a into the thermal fluid tank 126. Alternatively, or additionally, the controller 182 can be adapted to initiate such placement of the purge control valve 196 at the second position and operation of the driver 128 in response to the controller receiving a purge command from the operator.

According to certain embodiments, the controller 182 can be configured to operate the driver 128 for such purging of the first thermal fluid into the thermal fluid tank 126 for a predetermined period of time. The predetermined period of time may be based on the estimated time needed for a certain portion, including most or all, of the first thermal fluid to be purged into the thermal fluid tank 126. Additionally, or alternatively, the controller 182 can receive information from one or more sensors indicating the purging is complete. For example, according to certain embodiments, one or more sensors can indicate a change in flow rate or mass of the first thermal fluid that can indicate the first thermal fluid has been purged into the thermal fluid tank 126. Upon completion of the purging operation, the controller 182 can issue a signal to place the purge control valve 196 back at the first position, and to deactivate operation of the driver 128.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A thermal management system comprising:
a first fluid pump and a second fluid pump, the first fluid pump positioned for at least partial submersion in a first thermal fluid in a thermal fluid tank of a first thermal circuit, the second fluid pump positioned for at least partial submersion in a second thermal fluid in a first pressurized reservoir of a second fluid circuit;
a first drive shaft coupled to a driver and the first fluid pump, the first fluid pump being operated by a rotational displacement of the first drive shaft by the driver, the first fluid pump being configured to provide a first force to circulate the first thermal fluid through the first fluid circuit, a second portion of the first drive shaft positioned in an interior area of the first thermal fluid tank, a first portion of the first drive shaft being positioned outside of the thermal fluid tank and not directly physically attached to the second portion of the first drive shaft;
a second drive shaft coupled to the second fluid pump and coupled to the first portion of the first drive shaft by a clutch, the second fluid pump being operated by a rotational displacement of the second drive shaft to provide a second force to circulate a second thermal fluid at least through a heat exchanger of the second fluid circuit positioned in the thermal fluid tank; and
a magnetic coupling having a first portion and a second portion, the first portion of the magnetic coupling attached to the first portion of the first drive shaft and positioned outside of the thermal fluid tank, the second portion of the magnetic coupling coupled to the second portion of the first drive shaft and positioned in the interior area of the thermal fluid tank;
wherein the magnetic coupling transfers a force between the first and second portions of the magnetic coupling to rotatably displace the first portion of the magnetic coupling, and thereby rotate the second portion of the second drive shaft, with the rotational displacement of the first portion of the magnetic coupling as the first portion of the first drive shaft is rotably displaced by operation of the driver, and
wherein the clutch is selectively displaceable from an engaged position at which the rotational displacement of the first portion of the first drive shaft is transmitted by the clutch to facilitate the rotational displacement of the second drive shaft, and a disengaged position at which the rotational displacement of the first portion of the first drive shaft is not transmitted by the clutch to facilitate the rotational displacement of the second drive shaft.

2. The thermal management system of claim 1, wherein the first drive shaft does pass through or breach the thermal fluid tank.

3. The thermal management system of claim 1, further comprising a memory device coupled with at least one processor, the memory device including instructions that when executed by the at least one processor cause the at least one processor to:
(a) determine if a temperature of the first thermal fluid in the thermal fluid tank satisfies a predetermined threshold;
(b) generate, in response to the temperature being determined to not satisfy the predetermined threshold, a signal to displace the clutch to the engaged position; and
(c) generate, in response to the temperature being determined to satisfy the predetermined threshold, a signal to displace the clutch to the disengaged position,
wherein step (a) is repeated until the temperature is determined to satisfy the predetermined threshold.

4. The thermal management system of claim 3, wherein the first fluid circuit is configured to circulate the first thermal fluid to a battery, and wherein the memory device further includes instructions that when executed by the at least one processor cause the at least one processor to:
determine if a predetermined time period has expired since the battery has been charged;
generate, if the predetermined time period is determined to have expired, a first signal to open a purge control valve to receive air into the first fluid circuit and a second signal to displace the clutch to the disengaged position; and generate, with the purge control valve open, a signal to operate the driver, operation of the driver rotating the first drive shaft to operate the first fluid pump to draw air into the first fluid circuit.

5. The thermal management system of claim 4, wherein the memory device further includes instructions that when executed by the at least one processor cause the at least one processor to determine if an ambient temperature is below a predetermined temperature, and wherein the first and second signals are generated if the predetermined time period has expired and the ambient temperature is below the predetermined temperature.

6. The thermal management system of claim 1, wherein the clutch is an electromagnetic clutch.

7. The thermal management system of claim 1, wherein the first fluid circuit is fluidly isolated from the second fluid circuit.

8. The thermal management system of claim 1, further comprising a second pressurized reservoir, and wherein the second force provided by the second fluid pump draws the second thermal fluid from the second pressurized reservoir.

9. The thermal management system of claim 1, wherein the driver is a single driver.

10. The thermal management system of claim 1, wherein the first fluid circuit is configured to circulate the first thermal fluid at least to a battery.

11. A method for operating a thermal management system, the method comprising:
determining if a temperature is below a predetermined temperature;
activating, in response to determining the temperature is below the predetermined temperature, a magnetic clutch to magnetically couple a first portion of the magnetic clutch to a second portion of the magnetic clutch, the first portion of the magnetic clutch being coupled to a first portion of a first drive shaft that is positioned outside of a thermal fluid tank, the second portion of the magnetic clutch being coupled to a second portion of a first drive shaft that is positioned in an interior area of the thermal fluid tank, the second portion of the first drive shaft being coupled to a first fluid pump;
activating a driver to provide a drive force to rotatably displace the first portion of the first drive shaft, the rotational displacement of the first portion of the first drive shaft being transmitted via the activated magnetic clutch to facilitate rotational displacement of the second portion of first drive shaft, an operation of the first fluid pump being driven by rotational displacement of the second portion of first drive shaft;
engaging a clutch that is coupled to the first portion of the first drive shaft and a second drive shaft, the clutch configured to transmit a portion of the drive force to rotatably displaced the second drive shaft, an operation of a second fluid pump of a first pressurized reservoir being driven by rotational displacement of the second drive shaft;

circulating, via the operation of the first fluid pump, at least a portion of a first thermal fluid out of the thermal fluid tank and along at least a portion of a first fluid circuit;

drawing, via the operation of the second fluid pump, a second thermal fluid into a heat exchanger in the thermal fluid tank;

determining if the temperature has increased to at least satisfy the predetermined temperature; and deactivating, in response to the temperature satisfied the predetermined temperature, the operation of the second fluid pump by disengaging the clutch.

12. The method of claim 11, wherein the temperature is a temperature of a first thermal fluid in a thermal fluid tank.

13. The method of claim 12, wherein the first fluid pump is at least partially submerged in the first thermal fluid in the thermal fluid tank.

14. The method of claim 13, wherein the first drive shaft does not pass through or breach the thermal fluid tank.

15. The method of claim 11, wherein the first fluid circuit is configured to circulate the first thermal fluid to a battery, and wherein the method further comprises:
determining if a predetermined time period has expired since the battery has been charged;
generating, if the predetermined time period is determined to have expired, a first signal to open a purge control valve to receive air into the first fluid circuit and a second signal to displace the clutch to a disengaged position; and
generating, with the purge control valve open, a signal to operate the first fluid pump to draw air into the first fluid circuit.

16. The method of claim 15, further comprising determining if an ambient temperature is below a predetermined temperature, and wherein the first and second signals are generated if the predetermined time period has expired and the ambient temperature is below the predetermined temperature.

17. The method of claim 11, wherein the first fluid circuit is configured to circulate the first thermal fluid to a battery, and wherein the method further comprises:
generating, in response to the temperature being determined to at least satisfy the predetermined temperature, a signal for the battery to either (1) deliver an electrical power the clutch facilitates displacement of the clutch an engaged position, or (2) cease delivery of the electrical power to the clutch to facilitate the displacement of the clutch to a disengaged position.

18. The method of claim 11, further comprising drawing the second thermal fluid into the second fluid pump from the first pressurized reservoir.

19. The method of claim 11, further comprising continuously operating the first fluid pump, but not the second fluid pump, while the driver is activated.

20. The method of claim 11, further comprising drawing the first thermal fluid into the first fluid pump through a standpipe in the thermal fluid tank.

* * * * *